DEMODULATOR CIRCUIT FOR PERIOD MODULATED SIGNALS

Filed July 26, 1965

INVENTOR
NORTON W. BELL
BY
Christie, Parker & Hale
ATTORNEYS.

3,386,041
Patented May 28, 1968

3,386,041

DEMODULATOR CIRCUIT FOR PERIOD MODULATED SIGNALS

Norton W. Bell, Pasadena, Calif., assignor, by mesne assignments, to Bell & Howell Company, Chicago, Ill., a corporation of Illinois Filed July 26, 1965, Ser. No. 474,903
5 Claims. (Cl. 329—102)

This invention relates to demodulator circuits and, more particularly, is concerned with a circuit for demodulating period modulated signals.

In copending application Ser. No. 231,916, filed Oct. 22, 1962, now Patent No. 3,319,013 in the name of Wayne K. Hodder, there is described a modulation scheme found particularly useful in the recording of broad band video signals on magnetic tape. The modulation described therein may be characterized as period modulation since the half period of the carrier signal, i.e., the time from one zero crossover to the next zero crossover forming a half cycle of the carrier, is varied linearly with the amplitude of the input information signal.

The present invention is directed to an improved circuit for demodulating a period modulation signal by providing an output from the demodulator that is linearly related to the time period of the period modulated signal.

In brief, the demodulator circuit includes a pair of transistors having their collector electrodes connected through a common load resistance to one end of a potential source. The emitter electrode of each transistor is connected through a pair of resistors in series to the other end of the potential source. Large capacitors connect the series junction points of the series resistors to an intermediate reference potential. The modulated carrier signal is applied in push-pull fashion to the respective base electrodes. A control capacitor of predetermined size is connected between the emitter electrodes of two transistors. The voltage swing across the control capacitor changes with the change in period of the input signal so as to control the average current through the two transistors in direct linear relationship to the change in the period of the input signal.

For a more complete understanding of the invention, reference should be made to the accompanying drawings wherein.

Figures 1, 2, 6:
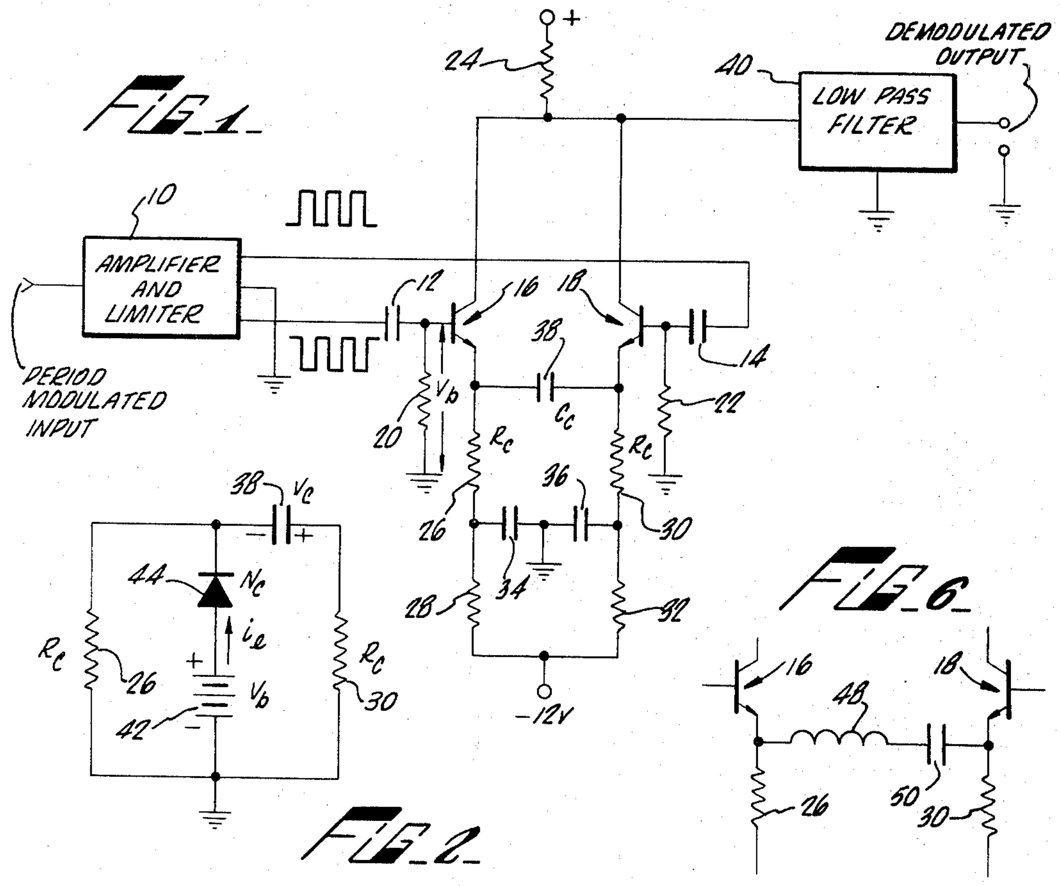
FIGURE 1 is a schematic diagram of one embodiment of the demodulator circuit of the present invention.
FIGURE 2 is a schematic diagram of an equivalent circuit useful in explaining the operation of the circuit of FIGURE 1.
FIGURE 6 is an alternative embodiment of the demodulator of the present invention.

Referring to FIGURE 1 in detail, the period modulated input signal is first applied to an amplifier and limiter circuit 10. The output of the amplifier and limiter circuit 10 is arranged as a double-ended or push-pull output providing a pair of square wave versions of the modulated input having opposite phase with respect to each other. The two output signals from the amplifier and limiter 10 are coupled respectively through coupling capacitors 12 and 14 to the respective base electrodes of a pair of transistors 16 and 18. The respective base electrodes are tied to ground through relatively large base resistors 20 and 22.

The collector electrodes of the transistors 16 and 18 are connected through a common load resistor 24 to the positive end of a potential source (not shown). The emitter electrodes of the transistors 16 and 18 are respectively connected through series resistors 26 and 28 and series resistors 30 and 32 to the negative terminal of the potential source. The series junction point between the resistors 26 and 28 is coupled to ground through a large capacitor 34. Similarly the series junction point between the resistors 30 and 32 is coupled to ground through a large capacitor 36. A control capacitor 38 is connected between the emitter electrodes for controlling the average emitter current conducted by the two transistors.

The demodulated output is derived from the collector electrodes and coupled through a low-pass filter 40 which removes the second harmonic of the carrier. The fundamental harmonic of the carrier is suppressed by the balanced operation of the two transistors.

Considering the operation, it should be noted that the capacitors 34 and 36 are quite large and the resistors 28 and 32 are very much larger than the resistors 26 and 30. Typically the RC time constant of the capacitor 34 and resistor 28, where the circuit is used for demodulating video signals, is longer than one frame, i.e., longer than a thirtieth of a second. Under normal operating conditions, the value of the resistors 28 and 32 and the negative voltage source are such that the voltages across the capacitors 34 and 36 are zero. Therefore the series junction points between the resistors 26 and 28 and the resistors 30 and 32 may be considered as being at ground reference potential.

The equivalent circuit during the time one of the transistors is turned on by the input signal applied to the base is shown in FIGURE 2. In the equivalent circuit, the voltage $V_b$ at the base electrode of the conducting transistor 16 is indicated by the battery 42, since the base electrode is driven positive during the positive-going portion of the square wave coupled through the capacitor 12 from the output of the amplifier and limiter circuit 10. The base-to-emitter junction of the transistor 16 is represented by a diode 44 with a voltage drop $V_e$ to represent the equivalent of the forward conducting voltage drop of the base-to-emitter junction.

Figure 3:
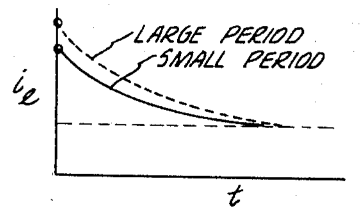
FIGURES 3, 4 and 5 are diagrams useful in the explanation of the operation of the invention.

It will be seen from FIGURE 2 that the equivalent of the emitter current $i_e$ will be made up of two components, the component of current flowing through the resistor 26 and the component of current flowing through the capacitor 38 and resistor 28. This can be expressed mathematically as $$i_e=\frac{V_b-V_e}{R_c}+\frac{V_c+V_b-V_e}{R_c}(e^{-t/R_cC_c}) \qquad (1)$$

where $V_c$ is the initial charge voltage across the capacitor 38 at the time the transistor 16 is turned on. FIGURE 3 is a plot of Equation 1 showing the change in $i_e$ as a function of time $t$. It will be seen from Equation 1 in FIGURE 3 that time $t=0$ when the transistor is turned on, the initial current level is at a maximum value determined by the initial charge on the capacitor 38, i.e. the value of $V_c$. This initial value of course is set during the previous half period when the other transistor 18 was turned on. From the initial level, the current $i_e$ drops off exponentially toward the minimum level at which all of the current flows through the resistor 26 and the capacitor 38 is fully charged.

Figure 4:
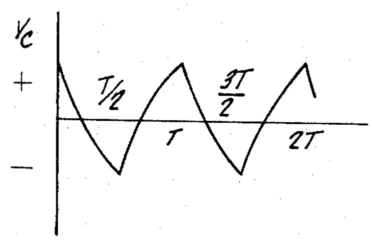

However, the time constant $R_cC_c$ is selected so that before the capacitor 38 becomes fully charged, the transistor 16 is turned off and the transistor 18 is turned on by the modulated input signal a half period later. As a result, the capacitor 38 is charged to the opposite polarity. FIGURE 4 shows the change in voltage $v_c$ across the capacitor 38 with time. The value of $v_c$ as a function of time is given by the following expression:

$$v_c=(V_c+V_b-V_e)e^{-t/R_cC_c}-(V_b-V_e) \qquad (2)$$

If the period of the input wave is constant over a number of cycles, the peak voltage $V_c$ across the capacitor 38 should be the same magnitude at each switching occurrence. By equating $v_c$ at time 0 as equal to $v_c$ at time $T/2$, we find that the peak voltage $V_c$ may be expressed as $$V_c=(V_b-V_e)\left[\frac{1-e^{-T/2R_cC_c}}{1+e^{-T2/R_cC_c}}\right]=(V_b-V_e)A \quad (3)$$

where A stands for the quantity in the brackets. It is apparent from Equation 3 and also from FIGURES 3 and 4 that the peak voltage $V_c$ developed across the capacitor 38 varies as a function of the period T of the modulated input signal and therefore it is evident that from Equation 1, the peak emitter current $i_e$ also varies with the change in the period T of the modulated input signal. This is illustrated in FIGURE 3 by the dash line which shows the emitter current $i_e$ for a large period and the solid line which shows the emitter current for a small period.

Because the demodulated output from the low-pass filter 40 depends upon the change in the average collector current, it is necessary to determine how the average emitter current of the two transistors varies with changes in the period T of the input signal. Substituting the value of $V_c$ as expressed in Equation 3 into the expression for the emitter current $i_e$ as given in Equation 1 results in the following expression:

$$i_e=\frac{V_b-V_e}{R_c}[1+(1+A)e^{-t/R_cC_c}] \quad (4)$$

Now by integrating, the average emitter current can be determined, as indicated by the following equation:

$$i_e(ave)=\frac{\int_0^T i_c dt}{T}=\frac{\int_0^{T/2} i_c dt}{T/2} \quad (5)$$

By carrynig out the above integration, it turns out that the average emitter current can be expressed as:

$$i_e\ (ave)=\frac{V_b-V_e}{R_c}\left[\frac{(1+A)(1-e)^{-T/2R_cC_c}}{T/2R_cC_c}+1\right] \quad (6)$$

The average output current to the filter is alpha times the emitter current as expressed by Equation 6, since only one transistor conducts at a time.

Figure 5:
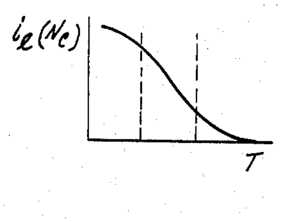

FIGURE 5 shows a plot of average emitter current as a function of the period T based on Equation 6. It will be noted that there is a substantial linear portion to the curve in FIGURE 5 between the dash lines. This linear region corresponds to more than a two to one change in the period, i.e., more than an octave range of the input period. Typical values of the components for operation of the circuit over a frequency range of one to two megacycles of the input signal are as follows:

| | | |
|---|---|---|
| Resistors 26 and 30 | ohms | 390 |
| Resistors 28 and 32 | do | 2500 |
| Resistor 24 | do | 1100 |
| Capacitors 34 and 36 | microfarads | 10 |
| Capacitor 38 | picofarads | 330 |

Figure 7:
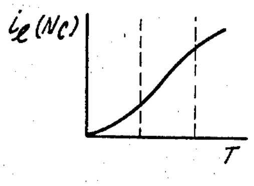
FIGURE 7 is a diagram showing the performance of the circuit of FIGURE 6.

An alternative arrangement is shown in FIGURE 6 in which an inductor 48 is used in place of capacitor 38 as an energy storage device. In addition, a large block capacitor 50 is used to provide DC isolation between the emitters of the two transistors 16 and 18. The remainder of the circuit is unchanged and therefore has not been completely shown in FIGURE 6. The inductance operates substantially the same as the capacitance except that the polarity of the output is reversed. This is shown by the curve in FIGURE 7 in which the average emitter current $i_e$ is plotted as a function of the period T of the modulated input signal. There is still provided a linear region but of positive slope extending over more than an octave change in the frequency of the input signal.

It will be appreciated from the above description that a relatively simple demodulator circuit has been provided for demodulating a period modulated carrier signal. The demodulator provides a linear change in output with change in the period of the input signal. The circuit works well with either silicon or germanium transistors and requires no precise or expensive components.

What is claimed is:

1. A demodulator comprising first and second transistors each having base, emitter and collector electrodes, means connecting the collector electrodes through a common load impedance to one end of a potential source, first and second resistors in series connecting the emitter of the first transistor to the other end of the potential source, third and fourth resistors connecting the emitter electrode of the second transistor to said other end of the potential source, a capacitor connected between the two emitter electrodes, a pair of capacitors respectively coupling the junction of the first and second resistors and the junction of the third and fourth resistors to a reference potential intermediate the potentials at the two ends of said source, a low-pass filter coupled to the collector electrodes for deriving a demodulated output signal through the filter, and means for applying a pair of time modulated square wave input signals of opposite phase to the base electrodes of the two transistors.

2. A demodulator comprising first and second transistors each having base, emitter and collector electrodes, means connecting the collector electrodes through a common load impedance to one end of a potential source, first and second resistors in series connecting the emitter of the first transistor to the other end of the potential source, third and fourth resistors connecting the emitter electrode of the second transistor to said other end of the potential source, an inductor connected between the two emitter electrodes, a pair of capacitors respectively coupling the junction of the first and second resistors and the junction of the third and fourth resistors to a reference potential intermediate the potentials at the two ends of said source, a low-pass filter coupled to the collector electrodes for deriving a demodulated output signal through the filter, and means for applying a pair of time modulated square wave input signals opposite phase to the base electrodes of the two transistors.

3. A demodulator comprising first and second transistors each having base, emitter and collector electrodes, means connecting the collector electrodes through a common load impedance to one end of a potential source, first and second resistors in series connecting the emitter of the first transistor to the other end of the potential source, third and fourth resistors connecting the emitter electrode of the second transistor to said other end of the potential source, a reactive impedance connected between the two emitter electrodes, a pair of capacitors respectively coupling the junction of the first and second resistors and the junction of the third and fourth resistors to a reference potential intermediate the potentials at the two ends of said source, a low-pass filter coupled to the collector electrodes for deriving a demodulated output signal through the filter, and means for applying a pair of time modulated square wave input signals of opposite phase to the base electrodes of the two transistors.

4. A demodulator comprising first and second transistors each having base, emitter and collector electrodes, means connecting the collector electrodes to one end of a potential source, resistor means connecting the emitter of the first transistor and the emitter of the second transistor to the other end of the potential source, a capacitor connected between the two emitter electrodes, a low-pass filter coupled to the collector electrodes for deriving a demodulated output signal through the filter, and means for applying a pair of time modulated square wave input signals of opposite phase to the base electrodes of the two transistors.

5. A demodulator comprising first and second transistors each having base, emitter and collector electrodes, means connecting the collector electrodes to one end of a potential source, resistor means connecting the emitter of the first transistor and the emitter of the second transistor to the other end of the potential source, a reactive impedance connected between the two emitter electrodes, a low-pass filter coupled to the collector electrodes for deriving a demodulated output signal through the filter, and means for applying a pair of time modulated square wave input signals of opposite phase to the base electrodes of two transistors.

References Cited

UNITED STATES PATENTS

| | | | |
|---|---|---|---|
| 3,153,203 | 10/1964 | Sem-Jacobse et al. | 330—30 |
| 3,290,617 | 12/1966 | Bellem | 332—14 |
| 3,328,710 | 6/1967 | Baldwin | 329—103 |

ALFRED L. BRODY, *Primary Examiner.*

UNITED STATES PATENT OFFICE

CERTIFICATE OF CORRECTION

Patent No. 3,386,041 May 28, 1968

Norton W. Bell

It is certified that error appears in the above identified patent and that said Letters Patent are hereby corrected as shown below:

Column 3, lines 6 to 8, the lower portion of the equation reading $1+e^{-T2/R_CC_C}$ should read $1+e^{-T/2\ R_CC_C}$ line 37, "carrynig" should read -- carrying --.

Signed and sealed this 21st day of October 1969.

(SEAL)
Attest:

Edward M. Fletcher, Jr.
Attesting Officer

WILLIAM E. SCHUYLER, JR.
Commissioner of Patents